United States Patent
Schindler et al.

(10) Patent No.: US 8,292,245 B2
(45) Date of Patent: Oct. 23, 2012

(54) ROOF MOUNTED AIR HOSE AND ELECTRICAL CORD HOLDER

(76) Inventors: Terrence R. Schindler, Blair, NE (US); Nicholas J. Rife, Omaha, NE (US)

(*) Notice: Subject to any disclaimer, the term of this patent is extended or adjusted under 35 U.S.C. 154(b) by 189 days.

(21) Appl. No.: 12/928,633

(22) Filed: Dec. 15, 2010

(65) Prior Publication Data
US 2012/0153090 A1 Jun. 21, 2012

(51) Int. Cl.
*A47G 29/02* (2006.01)
*A62B 1/16* (2006.01)

(52) U.S. Cl. .............. 248/237; 248/80; 248/536; 182/3; 137/355.16

(58) Field of Classification Search .............. 248/49, 248/75, 79, 80, 218.4, 22.51, 222.5, 237, 248/499, 507, 220.1, 536; 182/3, 45, 36, 182/107, 214, 231; 52/689, 703, 704, 741.1; 137/355.12, 355.16, 355.17, 355.19, 355.26
See application file for complete search history.

(56) References Cited

U.S. PATENT DOCUMENTS

| | | | | |
|---|---|---|---|---|
| 2,597,733 | A * | 5/1952 | Jackson | 248/536 |
| 4,249,713 | A | 2/1981 | Glynn et al. | |
| 4,607,724 | A * | 8/1986 | Hillberg | 182/3 |
| 4,942,943 | A * | 7/1990 | Flaherty | 182/231 |
| 5,143,971 | A * | 9/1992 | Stanislawczyk | 524/833 |
| 5,287,944 | A * | 2/1994 | Woodyard | 182/3 |
| 5,379,859 | A * | 1/1995 | Pigman | 182/45 |
| 5,730,407 | A * | 3/1998 | Ostrobrod | 248/237 |
| 6,095,462 | A | 8/2000 | Morgan | |
| 6,668,509 | B1 * | 12/2003 | Krebs | 52/698 |
| 6,786,020 | B2 * | 9/2004 | Poldmaa | 52/698 |
| 7,185,739 | B1 * | 3/2007 | Blehm | 182/214 |
| 7,814,938 | B2 | 10/2010 | Davis, Jr. et al. | |
| 2006/0059858 | A1 | 3/2006 | Layman | |
| 2008/0283137 | A1 | 11/2008 | Davis, Jr. et al. | |

* cited by examiner

*Primary Examiner* — Tan Le
(74) *Attorney, Agent, or Firm* — Dennis L. Thomte; Thomte Patent Law Office LLC

(57) ABSTRACT

A roof mounted air hose holder is provided which is adapted to be mounted on roofs having different pitches. The air hose holder may also be mounted on a flat roof. In a modified form of the invention, one of the air hose reels of the air hose holder may be replaced by an electrical cord reel. In another embodiment, both of the air hose reels may be replaced by electrical cord reels.

20 Claims, 6 Drawing Sheets

ROOF MOUNTED AIR HOSE AND ELECTRICAL CORD HOLDER

BACKGROUND OF THE INVENTION

1. Field of the Invention

This invention relates to an air hose holding device for use on a pitched roof having a ridge with first and second roof portions extending downwardly and outwardly from the ridge. More particularly, the air hose holding device of this invention includes a pair of air hose reels mounted on an upstanding post which may be attached to roofs having varying pitches. The invention also relates to an electrical cord holding device for use on either a flat roof or a pitched roof.

2. Description of the Related Art

The construction of a roof of a building normally involves the use of pneumatic tools such as nailers, etc. The pneumatic tools are connected to a source of air under pressure such as an air compressor by long air hoses. Since the roofs are normally pitched, it is difficult to maintain the hoses on the roof without them sliding downwardly to the ground taking the pneumatic tool with it. Further, if the air hoses are spread all over the roof, they pose a tripping danger to the roofer.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In the preferred embodiment, the invention relates to an air hose holding device for use on a pitched roof having a ridge, with first and second roof portions extending downwardly and outwardly from the ridge. The device includes first and second support brackets which are attached to the roof on opposite sides of the roof ridge. An upstanding post is positioned between the first and second support brackets with the first and second support brackets being adjustably secured to the post to accommodate roofs having different pitches. In the preferred embodiment, a pair of air hose reels is mounted on the upper end of the post with the air hose reels including a retractable reel having the air hose wrapped therearound with the air hose being in operative communication with a source of air under pressure such as an air compressor or the like. In the preferred embodiment, one end of a safety line is attached to the device with the other end of the safety line being attached to a roofer.

In a second embodiment, an electrical cord reel is substituted for one of the air hose reels so that both pneumatic power and electrical power may be supplied to pneumatic and electrical tools on the roof.

In a third embodiment, a holding device is an electrical cord holding device with a pair of electrical cord reels mounted on an upstanding post.

The holding device of this invention may be used on a pitched roof having various pitch angles or on a flat roof.

It is therefore a principal object of the invention to provide an air hose holding device for use on a roof whether the roof is pitched or flat.

A further object of the invention is to provide an air hose holding device for use on a pitched roof with the air hose holding device including a pair of air hose reels mounted thereon.

A further object of the invention is to provide an air hose holding device for use on a roof with a safety line being attached to the air hose holding device for use on a roof with a safety line being attached to the air hose holding device.

A further object of the invention is to provide a holding device which includes an air hose reel and an electrical cord reel.

A further object of the invention is to provide an air hose holding device which is of the retractable reel type.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
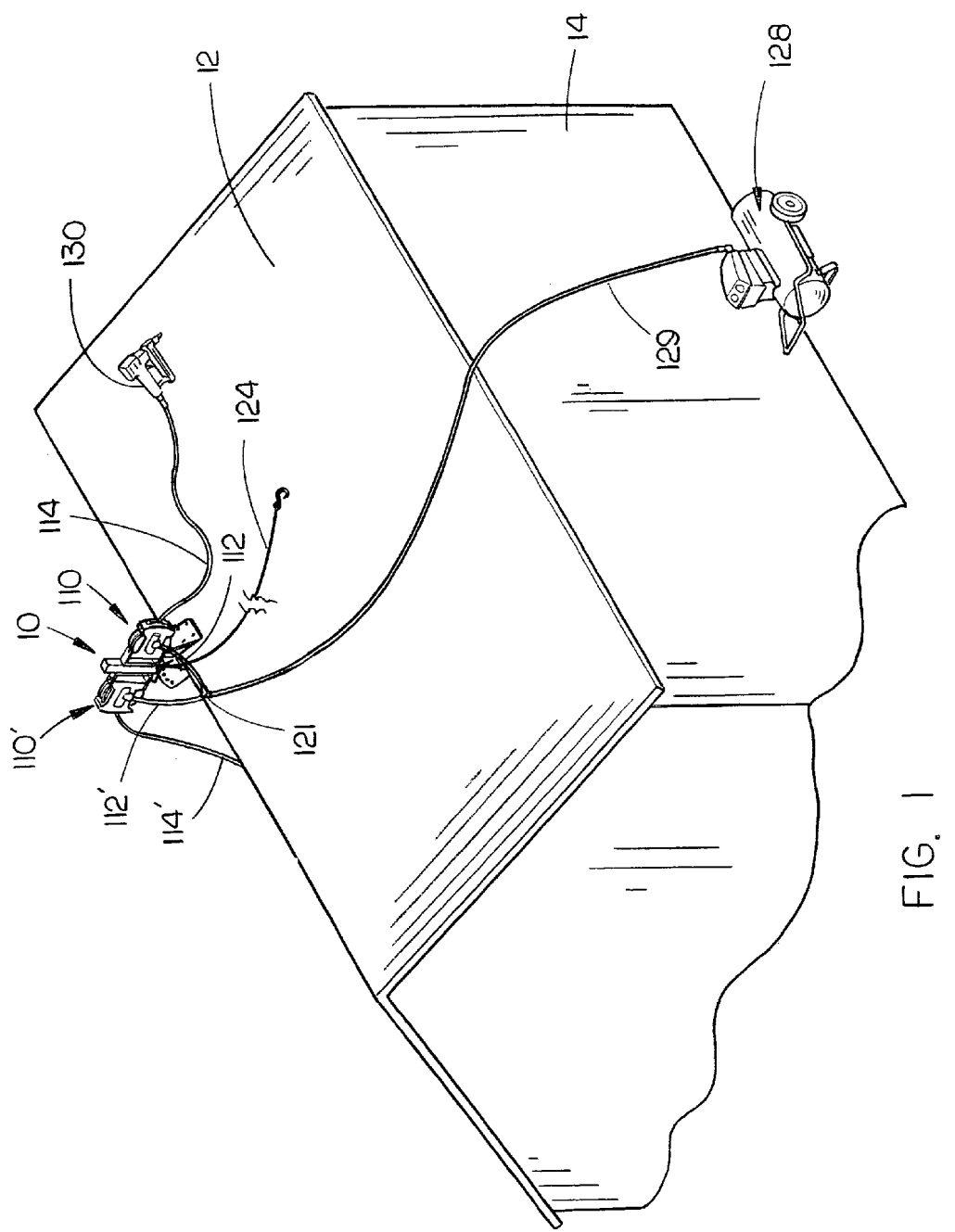
FIG. 1 is a partial perspective view illustrating the air hose holding device of this invention mounted on the ridge of a pitched roof.
Figure 4:
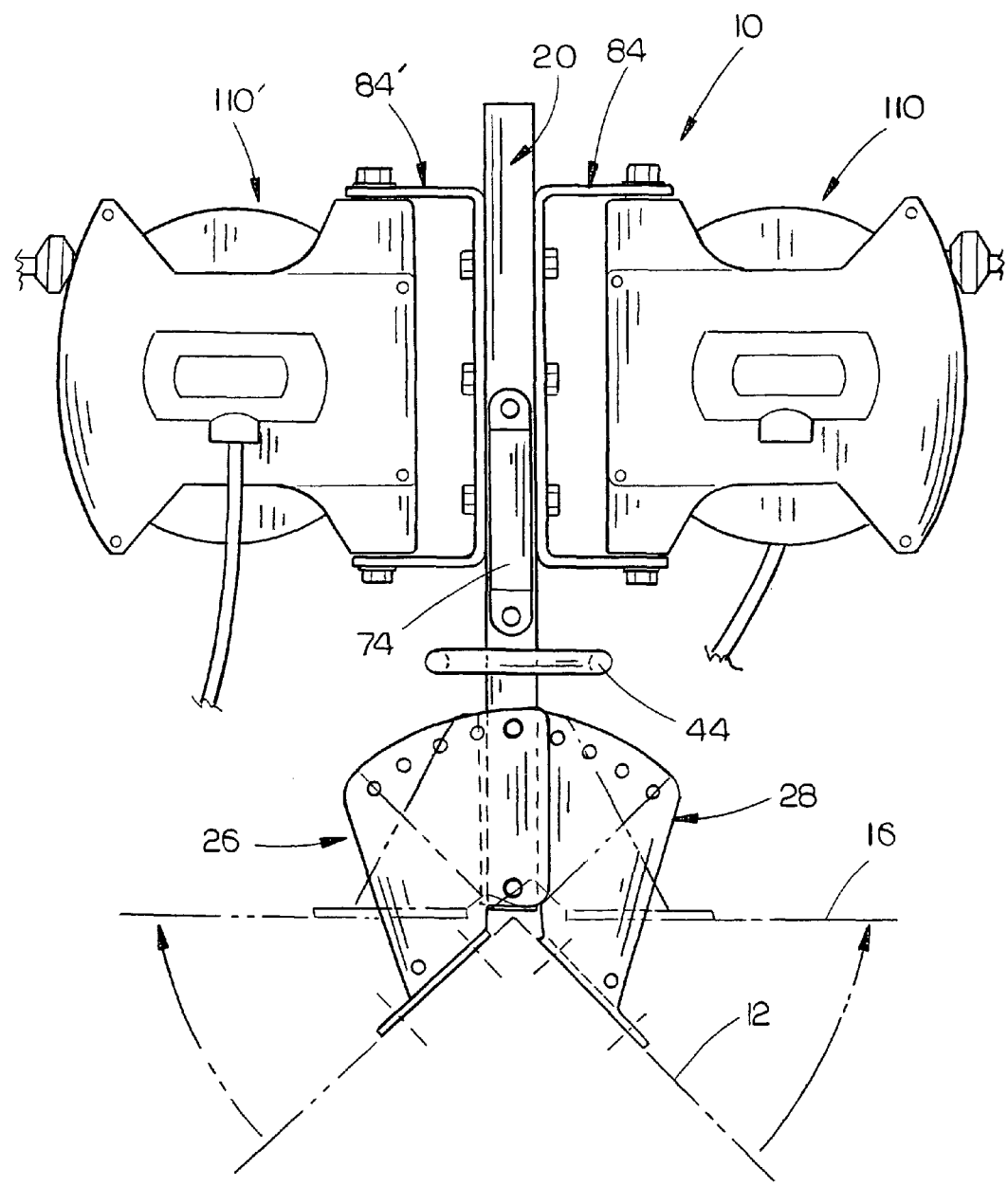
FIG. 4 is side view of the air hose holder of this invention which illustrates that the holder may be attached to a flat roof or a pitched roof having various pitches.
Figure 5:
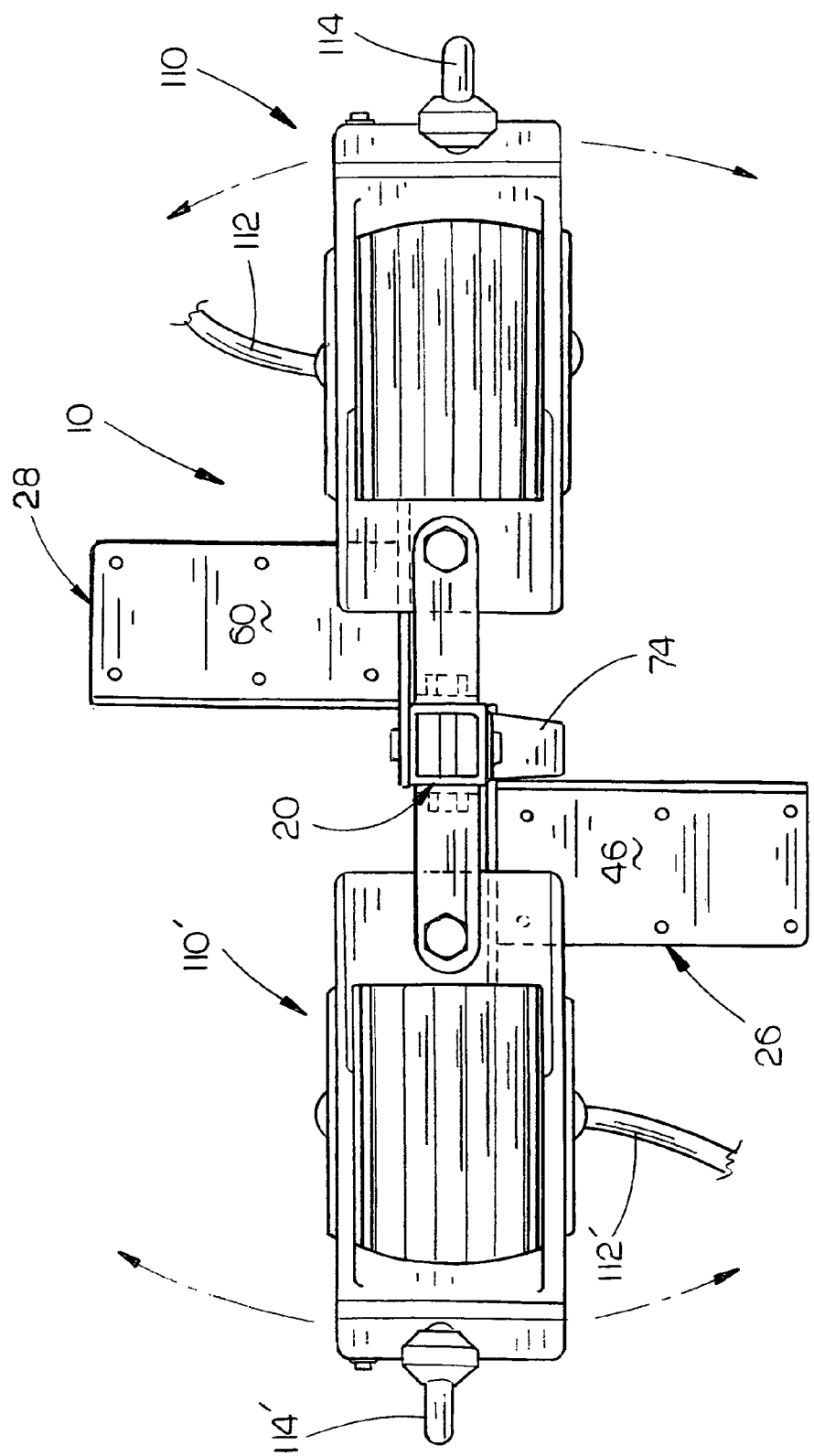
FIG. 5 is a top view of the air hose holder of this invention.

The roof mounted air hose holder of this invention is referred to by the reference numeral 10. Holder 10 may be mounted on the ridge 11 of a pitched roof 12, having different pitches, of a building 14 (FIG. 1) or on a flat roof 16 (FIG. 4). Holder 10 includes a roof bracket assembly 18 which is comprised of an upstanding post or tube 20, having an upper end 22 and a lower end 24, and roof attachment brackets 26 and 28. A cap 29 is secured to the upper end 22 of post 20.

Figure 2:
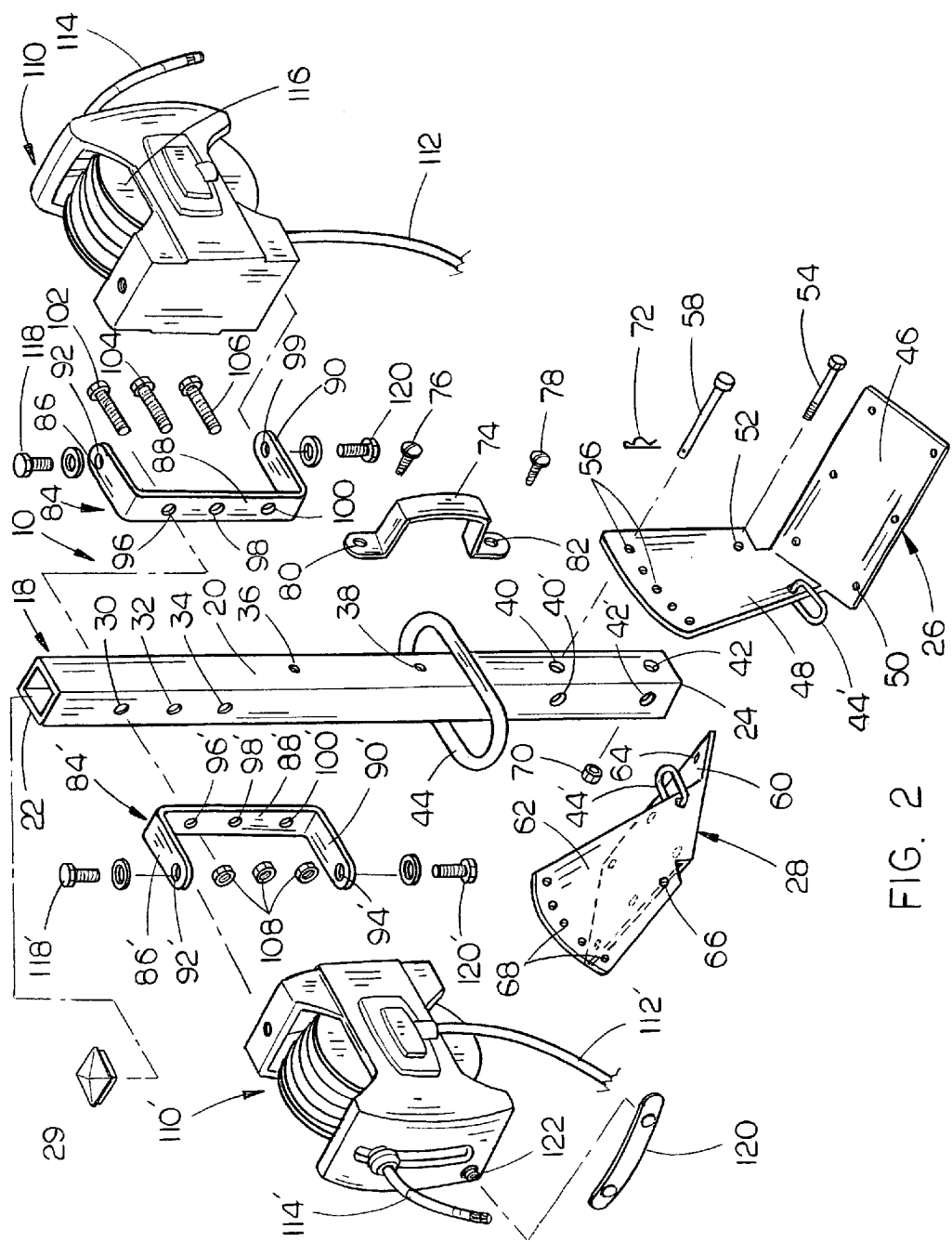
FIG. 2 is an exploded perspective view of the air hose holder of this invention.
Figure 3:
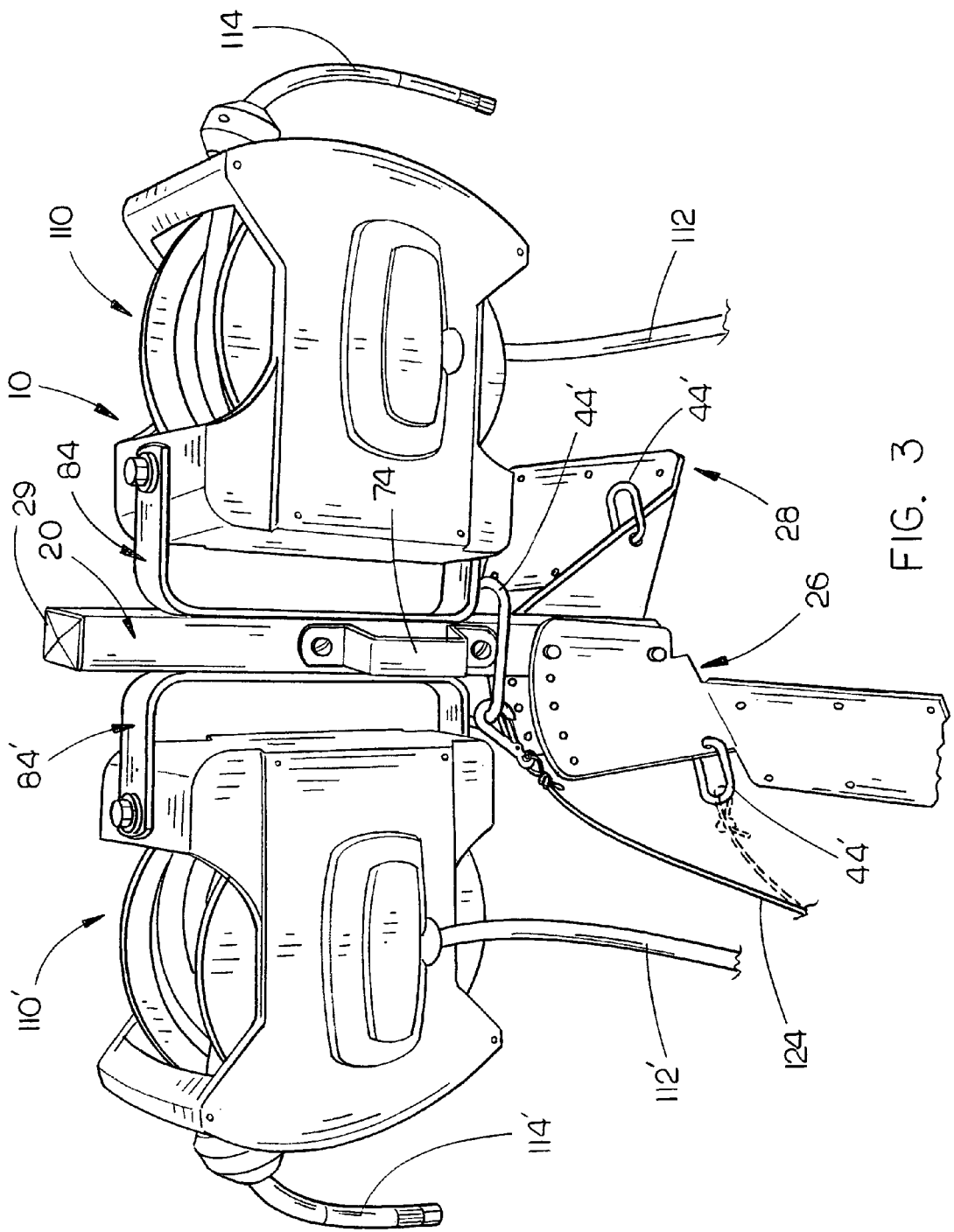
FIG. 3 is a perspective view of the air hose holder of this invention.

Post 20 is preferably comprised of steel and has spaced-apart bolt openings 30, 32 and 34 formed therein adjacent its upper end 22 as seen in FIG. 2. Post 20 also has a pair of spaced-apart openings 36 and 38 formed therein below the openings 30, 32 and 34. Post 20 is provided with a pin opening 40 and a pivot bolt opening 42 formed therein. Post 20 is also provided with a pin opening 40' and a pivot bolt opening 42' formed therein which are at a right angle with respect to pin opening 40 and pivot bolt opening 42. As seen in FIG. 2, a safety line bracket 44 is welded to post 20 between the upper and lower ends thereof. As will be described hereinafter, safety line brackets 44' could be secured to the attachment brackets 26 and 28.

Roof attachment bracket 26 is preferably comprised of steel and includes a lower flat base plate member 46 and an upstanding flat plate member 48 which extends upwardly from one edge of plate member 46 as seen in FIG. 2. Plate member 46 has a plurality of openings 50 formed therein. Plate member 48 has an opening 52 formed therein adjacent the lower end thereof which is adapted to receive pivot bolt 54. Plate member 48 has a plurality of spaced-apart openings 56 formed therein which are each adapted to receive locking pin 58 therein. A safety line bracket 44' may be attached to plate member 48 as seen in FIG. 2.

Roof attachment bracket 28 is preferably comprised of steel and includes a flat base plate member 60 and an upstanding flat plate member 62 which extends upwardly from one edge of plate member 60 as seen in FIG. 2. Plate member 60 has a plurality of spaced-apart openings 64 formed therein. Plate member 62 also has an opening 66 formed therein adjacent the lower end thereof which is adapted to receive pivot bolt 54 therein. Plate member 62 has a plurality of spaced-apart post openings 68 formed therein which are each adapted to receive locking pin 58 therein. A safety line bracket 44' may be attached to plate member 62 as seen in FIG. 2.

Brackets 26 and 28 are positioned on opposite sides of post 20. Pivot bolt 54 is extended through opening 52 in plate member 48 of bracket 26, through opening 42 in post 20, and through opening 66 in plate member 62 of bracket 28. Nut 70 is then threadably mounted on the threaded end of pivot bolt 54. Pin 58 is extended through one of the openings 56 in plate member 48 of bracket 26, through opening 40 of post 20, and through one of the openings 68 in plate member 62 of bracket 28. Locking key 72 is then attached to the exposed end of pin 58. Pivot bolt 54 may be also extended through opening 42' with pin 58 being extended through opening 40' so that the post 20 may be moved 90° from the position just described.

Handle 74 is secured to post 20 by screws 76 and 78 extending through openings 80 and 82 respectively in handle 74 and into openings 36 and 38 in post 20.

A reel mounting bracket 84 is provided and includes an upper leg 86, base 88 and lower leg 90. Leg 86 has an opening 92 formed therein and leg 90 has an opening 94 formed therein. Base 88 has three openings 96, 98 and 100 formed therein. A reel mounting bracket 84' is also provided which is identical to bracket 84 and which includes an upper leg 86', base 88' and lower leg 90'. Leg 86' has an opening 92' formed therein and leg 90' has an opening 94' formed therein. Base 88' has three openings 96', 98 and 100' formed therein. Brackets 84 and 84' are secured to post 20 by means of bolts 102, 104 and 106 extending through openings 96, 98 and 100 in base 88 of bracket 84 respectively, through openings 30, 32 and 34 in post 20 respectively, and through openings 96', 98' and 100' of leg 88' of bracket 84'. Nuts 108 are threadably mounted on the ends of bolts 102, 104 and 106.

The numeral 110 refers to a retractable air hose reel of conventional design which has an air inlet hose 112 and an air discharge hose 114 wound upon a retractable reel. Air hose reel 110 is pivotally mounted, about a vertical axis, to bracket 84 by means of bolts 118 and 120 which extend through openings 92 and 94 of legs 86 and 88 of bracket 84 respectively and which are threadably secured to the air hose reel 110. An identical air hose reel 110' is similarly pivotally mounted, about a vertical axis, to bracket 84' by bolts 118' and 120'. The air inlet hoses 112 and 112' are joined together at a Y-connector 121.

Air hose reels 110 and 110' are selectively pivotally movable with respect to brackets 84 and 84' so that the discharge hoses may be pulled from the air hose reels 110 and 110' in many directions. Air hose reels 110 and 110' may be selectively held in a stored position by means of a strap 122 which may be snapped onto a snap 122 on air hose reel 110' and onto a similar snap (snot shown) on air hose reel 110.

The numeral 124 refers to a safety line which has its inner end secured to safety line bracket 44 or one of the brackets 44'. The other end of the safety line may be attached to a person working on the roof.

Figure 6:
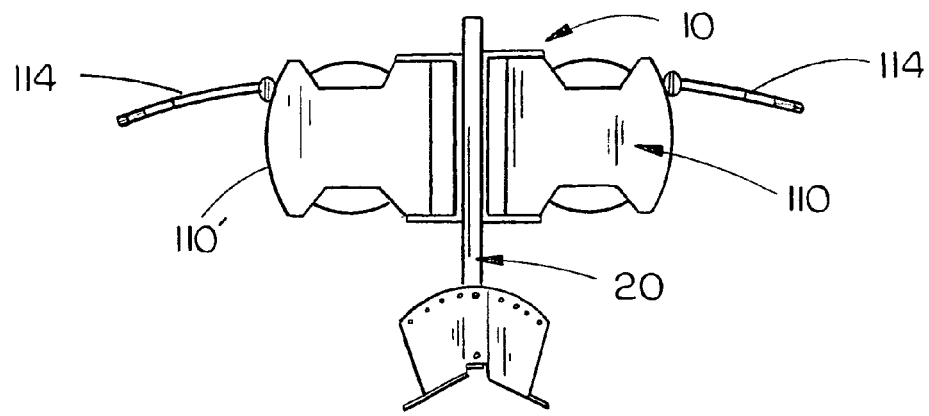
FIG. 6 is a side view illustrating the holder accommodating a pair of air hose reels.
Figure 7:
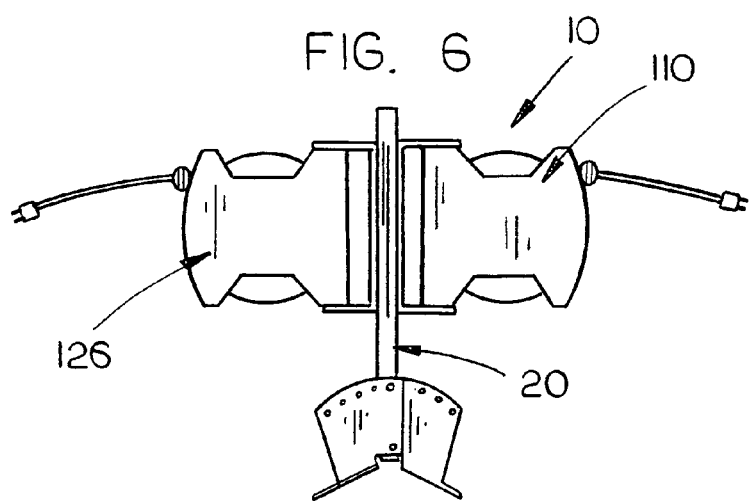
FIG. 7 is a side view similar to FIG. 6 except that a pair of electrical cord reels have been substituted for the air hose reels.
Figure 8:
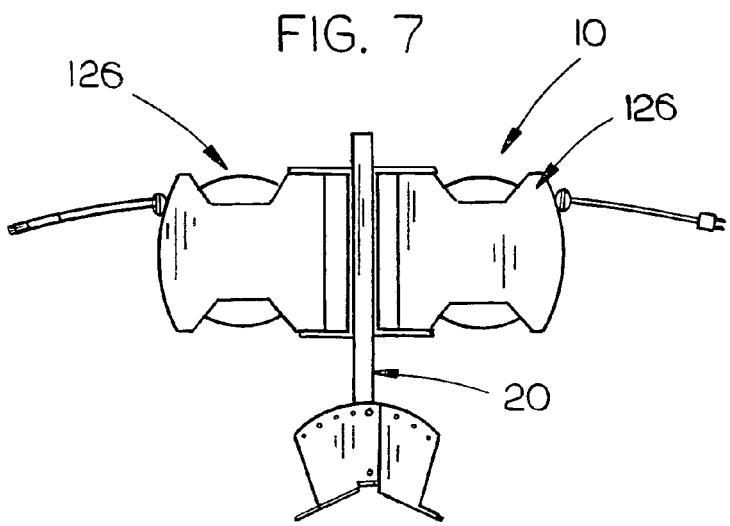
FIG. 8 is a view similar to FIGS. 6 and 7 except that the holder is shown to have an electrical cord reel and an air hose reel mounted thereon.

Although it is preferred that a pair of the air hose reels 110 and 110' be mounted on the post 20 as seen in FIG. 6, a single air hose reel could be utilized. Further, a single air hose reel 110 could be mounted on the post 20 with a conventional electrical cord reel 126 being mounted on the post 20 as seen in FIG. 8. Additionally, a pair of electrical cord reels 126 could be mounted on the post 20 as seen in FIG. 7.

The numeral 128 refers to an air compressor having an air line 129 extending therefrom which supplies air under pressure to the in air inlet hoses 112 and 112' by way of the Y-connector 121. The air discharge hoses 114 may be selectively connected to a pneumatic tool 130 on the roof.

The air hose holder 10 of this invention is mounted on a ridge 11 of a pitched roof 12. The holder 10 is adapted to be secured to the roof 12 having various pitches. The holder is assembled as previously described. The flat plate members 46 and 60 are nailed or screwed to the ridge of the roof by means of nails or screws extending through the openings 50 of plate member 48 and the openings 64 of plate member 60. The roof attachment brackets 26 and 28 may be adjusted with respect to the post 20 by adjusting the angle of the plate members 48 and 62 with respect to the post through the use of the retaining pin 58. The adjustment of the plate members 48 and 62 with respect to the post 20 changes the angular relationship of the plate members 46 and 60 to accommodate roofs having different pitches.

The air hose reels 110 and 110' may be selectively pivotally moved with respect to the post so that the air hoses 114 and 114' may extend from the post 20 at various angles. When the roofer requires the use of a pneumatic tool, either of the air hoses 114 or 114' may be pulled or extended from the retractable reels thereon and held in place by the conventional retractable mechanism. The air hose reels prevent the hoses 114 and 114' from sliding from the roof of the building due to the spring force resisting the same within the reels. Use of the air hose reels also aids in preventing the roofer from tripping over the hoses.

Although it is preferred that a pair of the retractable air hose reels 110 be utilized, a single air hose reel will still perform the intended function. Further, if so desired, one of the air hose reels 110 may be substituted by an electrical cord reel 126 as illustrated in FIG. 8. Further, a pair of the electrical cord reels 126 could be substituted for the air hose reels 110 and 110' as illustrated in FIG. 7.

Thus it can be seen that a novel air hose holder has been provided for use on roofs which are either flat or have pitches. It can therefore be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. An air hose holding device for use on a pitched roof having a ridge, with first and second roof portions extending downwardly and outwardly from the ridge, comprising:

a first support bracket having a first flat roof engaging plate member having inner and outer ends, a second flat upstanding plate member, having upper and lower ends, extending angularly upwardly from said inner end of said first plate member;

said first plate member having a plurality of openings formed therein;

said second plate member of said first support bracket having a plurality of spaced-apart openings formed therein adjacent said upper end thereof;

a second support bracket having a first flat roof engaging plate member having inner and outer ends, a second upstanding plate member, having upper and lower ends, extending angularly upwardly from said inner end of said first plate member thereof;

said first plate member of said second support bracket having a plurality of openings formed therein;

said second plate member of said second support bracket having a plurality of spaced-apart openings formed therein adjacent said upper end thereof;

said spaced-apart openings in said second plate member of said first support bracket being aligned with said spaced-apart openings in said second plate member of said second support bracket;

said first plate members of said first and second support brackets being selectively removably secured to said first and second roof portions on opposite sides of the ridge;

said second plate member of said first and second support brackets being horizontally spaced-apart in a parallel manner;

an upstanding post having an upper end and a lower end;

said post having its lower end positioned between said second plate member of said first and second support brackets;

said lower end of said post being selectively pivotally secured, about a horizontal axis, to said second plates of said first and second support brackets below said openings formed in said second plate members of said first and second support brackets; and a retaining pin selectively removably extending through one of said spaced-apart openings in said second plate member of said first support bracket, through said post, and through one of said spaced-apart openings in said second plate member of said second support bracket whereby the angles of said first plate members of said first and second support brackets may be varied to correspond to various pitch angles of the first and second roof portions;

an air hose reel mounted on said upstanding post which has an air intake side operatively connected to a source of air under pressure and a selectively retractable and extendable air hose which is adapted to be secured to a pneumatic tool for use on the roof.

2. The device of claim 1. wherein a pair of air hoses reels is mounted on said post.

3. The device of claim 1 wherein an electrical cord reel is also mounted on said upstanding post for connection to an electrically powered tool for use on the roof.

4. The device of claim 1 wherein said air hose reel is pivotally movably mounted to said upstanding post about a vertical axis.

5. The device of claim 2 wherein said hose reels are pivotally movably mounted to said upstanding post about vertical axes.

6. The device of claim 3 wherein said electrical cord reel is pivotally movably mounted to said upstanding post about a vertical axis.

7. The device of claim 1 wherein one end of a safety line is secured to said post.

8. An electrical cord holding device for use on a pitched roof having a ridge, with first and second roof portions extending downwardly and outwardly from the ridge, comprising:

a first support bracket having a first flat roof engaging plate member having inner and outer ends, a second flat upstanding plate member, having upper and lower ends, extending angularly upwardly from said inner end of said first plate member;

said first plate member having a plurality of openings formed therein;

said second plate member of said first support bracket having a plurality of spaced-apart openings formed therein adjacent said upper end thereof;

a second support bracket having a first flat roof engaging plate member having inner and outer ends, a second upstanding plate member, having upper and lower ends, extending angularly upwardly from said inner end of said first plate member thereof;

said first plate member of said second support bracket having a plurality of openings formed therein;

said second plate member of said second support bracket having a plurality of spaced-apart openings formed therein adjacent said upper end thereof;

said spaced-apart openings in said second plate member of said first support bracket being aligned with said spaced-apart openings in said second plate member of said second support bracket;

said first plate members of said first and second support brackets being selectively removably secured to said first and second roof portions on opposite sides of the ridge;

said second plate member of said first and second support brackets being horizontally spaced-apart in a parallel manner;

an upstanding post having an upper end and a lower end;

said post having its lower end positioned between said second plate member of said first and second support brackets;

said lower end of said post being selectively pivotally secured, about a horizontal axis, to said second plates of said first and second support brackets below said openings formed in said second plate members of said first and second support brackets; and a retaining pin selectively removably extending through one of said spaced-apart openings in said second plate member of said first support bracket, through said post, and through one of said spaced-apart openings in said second plate member of said second support bracket whereby the angles of said first plate members of said first and second support brackets may be varied to correspond to various pitch angles of the first and second roof portions;

an electrical cord reel mounted on said upstanding post which is operatively connected to a source of electrical power and a selectively retractable and extendable electrical cord which is adapted to be secured to an electric tool for use on the roof.

9. The device of claim 8 wherein a pair of electrical cord reels is mounted on said post.

10. The device of claim 8 wherein an air hose reel is also mounted on said upstanding post for connection to a pneumatically powered tool for use on the roof.

11. The device of claim 8 wherein said electrical cord reel is pivotally movably mounted to said upstanding post about a vertical axis.

12. The device of claim 9 wherein said electrical cord reels are pivotally movably mounted to said upstanding post about vertical axes.

13. The device of claim 10 wherein said air hose reel is pivotally movably mounted to said upstanding post about a vertical axis.

14. The device of claim 8 wherein one end of a safety line is secured to said post.

15. An electrical cord holding device for use on a flat roof or on a pitched roof having a ridge, with first and second roof portions extending downwardly and outwardly from the ridge, comprising:

a first support bracket having a first flat roof engaging plate member having inner and outer ends, a second flat upstanding plate member, having upper and lower ends, extending angularly upwardly from said inner end of said first plate member;

said first plate member having a plurality of openings formed therein;

said second plate member of said first support bracket having a plurality of spaced-apart openings formed therein adjacent said upper end thereof;

a second support bracket having a first flat roof engaging plate member having inner and outer ends, a second upstanding plate member, having upper and lower ends, extending angularly upwardly from said inner end of said first plate member thereof;

said first plate member of said second support bracket having a plurality of openings formed therein;

said second plate member of said second support bracket having a plurality of spaced-apart openings formed therein adjacent said upper end thereof;

said spaced-apart openings in said second plate member of said first support bracket being aligned with said spaced-apart openings in said second plate member of said second support bracket;

said first plate members of said first and second support brackets being selectively removably secured to the flat roof or to the first and second roof portions on opposite sides of the ridge;

said second plate member of said first and second support brackets being horizontally spaced-apart in a parallel manner;

an upstanding post having an upper end and a lower end;

said post having its lower end positioned between said second plate member of said first and second support brackets;

said lower end of said post being selectively pivotally secured, about a horizontal axis, to said second plates of said first and second support brackets below said openings formed in said second plate members of said first and second support brackets; and a retaining pin selectively removably extending through one of said spaced-apart openings in said second plate member of said first support bracket, through said post, and through one of said spaced-apart openings in said second plate member of said second support bracket whereby the angles of said first plate members of said first and second support brackets may be varied to correspond to various pitch angles of the first and second roof portions;

a pair of electrical cord reels mounted on said upstanding post which are operatively connected to a source of electrical power and a selectively retractable and extendable electrical cord which is adapted to be secured to an electric tool for use on the roof.

16. The device of claim 15 wherein a pair of electrical cord reels is mounted on said post.

17. The device of claim 15 wherein an air hose reel is also mounted on said upstanding post for connection to a pneumatically powered tool for use on the roof.

18. The device of claim 15 wherein said electrical cord reel is pivotally movably mounted to said upstanding post about a vertical axis.

19. The device of claim 16 wherein said electrical cord reels are pivotally movably mounted to said upstanding post about vertical axes.

20. The device of claim 15 wherein one end of a safety line is secured to said post.

* * * * *